United States Patent Office 2,868,782
Patented Jan. 13, 1959

2,868,782
POLYHYDRO-2-AZIRIDINO-1,4-NAPHTHO-QUINONES

Walter Gauss, Siegfried Petersen, and Gerhard Domagk, Leverkusen, Germany, assignors to Schenley Industries, Inc., a corporation of Delaware No Drawing. Application April 15, 1957
Serial No. 653,040

Claims priority, application Germany April 14, 1956

2 Claims. (Cl. 260—239)

This invention relates generally to novel organic chemical compounds useful in chemotherapy and more particularly it is concerned with certain novel polyhydro-2-aziridino-1,4-naphthoquinones possessed of cytostatic properties and thus useful in the study and treatment of cancer.

It is known that aziridine will react with 1,4-naphthoquinones whereby 2-aziridino-1,4-naphthoquinone reaction products are obtained, the reaction being conducted in an inert diluent such as methanol or ethanol. It is known also that $\alpha$-methylethyleneimine and $\alpha,\alpha$-dimethylethyleneimine react with 1,4-naphthoquinones in substantially the same manner and under substantially the same conditions as aziridine to produce the correspondingly substituted aziridinonaphthoquinones.

The novel compounds of this invention also are useful in chemotherapy as amoebicides and show particular activity against the microorganism *Entamoeba histolytica*.

The novel compounds of this invention may be represented by the following formula:

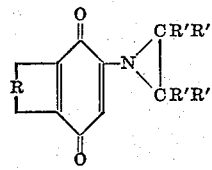

wherein R is a divalent radical selected from the group consisting of:

$$-CH_2.CH_2.CH_2.CH_2-$$
$$-CH=CH.CH_2.CH_2-$$
$$-CH_2.CH=CH.CH_2-$$

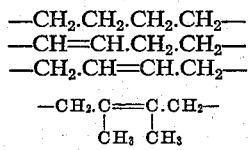

and R' is selected from the group consisting of hydrogen and methyl. These novel compounds may be prepared by reacting a suitably selected bz-polyhydro-1,4-naphthoquinone with aziridine or a methyl-substituted aziridine in a suitable solvent medium such as methanol or ethanol.

Among the naphthoquinones which may be used as starting materials for preparation of the novel products of this invention are 5,6,7,8-tetrahydro-1,4-naphthoquinone, 5,8-dihydro-1,4-naphthoquinone, 6,7-dimethyl-5,8-dihydro-1,4-naphthoquinone, and 5,8-dihydro-1,4-naphthoquinone. These naphthoquinones can be prepared, if desired, through use of the Diels-Alder synthesis.

The following are examples of reactable $\alpha,\beta$-alkyleneimines that may be used in preparing the novel compounds of this invention: ethyleneimine, $\alpha$-methyl-ethyleneimine, and $\alpha,\alpha$-dimethyl-ethyleneimine.

To facilitate a fuller and more complete understanding of the subject matter of this invention a specific example herewith follows, provided by way of illustration merely and not to be construed as imposing any limitation upon the scope of the subjoined claims.

Example

A warm solution of 64.8 grams of 5,6,7,8-tetrahydro-1,4-naphthoquinone in 200 cubic centimeters of methanol is instilled within a 15 minute period into a mixture of 40 cubic centimeters of methanol and 20.8 cubic centimeters of aziridine, while stirring and cooling with ice. Ice-cooling is continued for about 15 minutes more, and for another 20 minutes the mixture is stirred in a vessel in an ice sodium chloride freezing mixture. The 2-aziridino-5,6,7,8-tetrahydro-1,4-naphthoquinone, which separates from the reaction mixture as orange-red laminae, is filtered off under suction and washed with precooled methanol. The yield of air-dried product is about 25.6 grams; its melting point is 101–102° C. and does not change following recrystallisation of the product from alcohol.

Having thus described the subject matter of this invention, what it is desired to secure by Letters Patent of the United States is:

1. As a new composition of matter, a polyhydro-2-alkyleneimino-1,4-naphthoquinone represented by the formula:

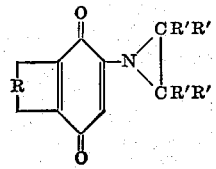

wherein R is a divalent radical selected from the group consisting of:

$$-CH_2.CH_2.CH_2.CH_2-$$
$$-CH=CH.CH_2.CH_2-$$
$$-CH_2.CH=CH.CH_2-$$

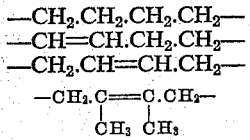

and R' is selected from the group consisting of hydrogen and methyl.

2. As a new composition of matter, 2-aziridino-5,6,7,8-tetrahydro-1,4-naphthoquinone.

References Cited in the file of this patent

UNITED STATES PATENTS 2,770,617    Marxer _____ Nov. 13, 1956

OTHER REFERENCES

Peterson et al.: Angewandte Chemie, 67, 229 (1955).